(12) United States Patent
Oroku et al.

(10) Patent No.: US 7,861,938 B2
(45) Date of Patent: Jan. 4, 2011

(54) RFID THREAD AND SHEET-SHAPED MATERIAL USING IT

(75) Inventors: Noriyuki Oroku, Takasaki (JP); Hidehiko Kando, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 12/185,993

(22) Filed: Aug. 5, 2008

(65) Prior Publication Data
US 2009/0090784 A1    Apr. 9, 2009

(30) Foreign Application Priority Data
Aug. 9, 2007    (JP)    ............... 2007-208226

(51) Int. Cl.
*G06K 19/06*    (2006.01)
(52) U.S. Cl. ...................................... 235/492
(58) Field of Classification Search .............. 235/375, 235/479, 486, 487, 488, 492
See application file for complete search history.

(56) References Cited

U.S. PATENT DOCUMENTS

| | | | | |
|---|---|---|---|---|
| 4,313,984 A * | 2/1982 | Moraw et al. | ................. | 428/13 |
| 5,856,662 A * | 1/1999 | Kohama et al. | ............. | 235/492 |
| 6,435,415 B1 * | 8/2002 | Catte | ......................... | 235/492 |
| 2007/0190288 A1 * | 8/2007 | You | ........................... | 428/113 |

FOREIGN PATENT DOCUMENTS

| | | |
|---|---|---|
| JP | 2000-231615 | 8/2000 |
| JP | 2002-319006 | 10/2002 |
| JP | 2004-295466 | 10/2004 |
| JP | 2005-209103 | 8/2005 |
| JP | 2005-284389 | 10/2005 |
| JP | 2005-350823 | 12/2005 |
| JP | 2006-159615 | 6/2006 |
| JP | 2006-163787 | 6/2006 |

* cited by examiner

*Primary Examiner*—Seung H Lee
(74) *Attorney, Agent, or Firm*—Antonelli, Terry, Stout & Kraus, LLP.

(57) ABSTRACT

The present invention provides a sheet-shaped material containing an RFID thread. The RFID thread comprises a strip-shaped film onto one side of which a semiconductor chip containing plural bits of memory and provided with an antenna wire is bonded. The strip-shaped film has plural openings formed therethrough except where the semiconductor chip is bonded. Since intertwining occurs between paper fibers via the openings, the RFID thread is strongly fixed in the paper.

10 Claims, 9 Drawing Sheets

RFID THREAD AND SHEET-SHAPED MATERIAL USING IT

The present application claims priority from Japanese patent application JP2007-208226 filed on Aug. 9, 2007, the content of which is hereby incorporated into this application.

BACKGROUND OF THE INVENTION

1. Field of the Invention

The present invention relates to RFID threads, which are attached to or rolled in securities, banknotes and the like to prevent forgery thereof, and sheet-shaped materials using them. In particular, the invention relates to semiconductor chip-incorporated ones which allow at least contactless retrieval of information.

2. Description of the Related Art

Conventionally, to provide a thin sheet of paper or the like with an RFID, it is common to affix the RFID to a seal-like tag coated beforehand with gum or the like and then affix this seal to the objective thin sheet.

In other known methods, an RFID tag formed beforehand into a thread shape is rolled in paper (Patent Document 1) and an RFID tag is fixed with gum between two sheets of paper (Patent Document 2). In these methods, the RFID can be held therein enough strongly due to the stiffness of the paper if the paper is thick enough or the RFID tag is thin enough.

Also known is a thread comprising a strip-shaped first sheet substrate on which an IC chip allowing at least contactless retrieval of information is mounted and a strip-shaped second sheet substrate laminated on the first sheet substrate, characterized in that holes are bored from the top to the bottom outside the IC chip area (Patent Document 3). If a thread of this construction is affixed to securities, banknote or other sheet with an adhesive, the adhesive penetrates into the through holes and thereby causes wedge effect between the thread and the adhesive, making the thread less likely to separate from the sheet.

[Patent Document 1] JP-A-2002-319006
[Patent Document 2] JP-A-2005-350823
[Patent Document 3] JP-A-2005-284389

SUMMARY OF THE INVENTION

In the common method of affixing an RFID tag to a thin sheet of paper or the like as mentioned above, its anti-counterfeit effect is low since the presence of the affixed RFID tag can easily be recognized from the appearance. This method also has a disadvantage that restrictions are imposed on the design of the appearance.

In the method described in Patent Document 1 or Patent Document 2, specifically, if a 30 μm-thick base film 20 made of PET having a 3 mm-wide RFID formed thereon as shown in FIG. 7 is developed to a paper sheet with a total uniform thickness of 0.1 mm, stiffness is not so given to the RFID as expected since covering layer of the RFID with paper is very thin. Further, since the cellulose-based glue for paper cannot fix the polyester film enough strongly, external force during use may detach the internal RFID from the upper and lower paper layers 40 and causes the upper and lower paper layers 40 to float as shown in a cross sectional view of FIG. 8. In an extreme case, the RFID base film 20 falls off.

The method described in Patent Document 3 also has a problem that since the adhesive penetrates into the through holes when the thread is affixed to a sheet with an adhesive, hardening of the adhesive causes a decrease in flexibility and therefore lowers the easiness of handling and it is difficult to thin the tag like a thin sheet.

Any of the above-mentioned prior art techniques has a problem that although an RFID base film must be bonded to paper in order to fix the RFID, it is difficult to attain sufficiently strong bonding if the tag is thinned like a thin sheet.

To solve the above-mentioned problem, the present invention provides a sheet-shaped material comprising a strip-shaped film onto one side of which a semiconductor chip containing plural bits of memory and provided with an antenna wire is bonded and a paper sheet, wherein the strip-shaped film is rolled in the paper sheet so that the upper layer and lower layer of the paper sheet are bonded together by means of intertwining between upper paper fibers and lower paper fibers.

The film may have plural openings disposed therethrough except where the semiconductor chip is mounted so that intertwining occurs between upper paper fibers and lower paper fibers of the paper sheet.

The openings may be arranged in two rows of round holes formed at the same pitch by punch-out.

The openings may be plural U-shaped notches whose internal areas are lifted up.

The film may have dimples formed except where the semiconductor chip is mounted.

The dimples may be obtained by forming plural non-open impressions.

Further, the present invention provides an RFID thread comprising a strip-shaped film onto one side of which a semiconductor chip containing plural bits of memory and provided with an antenna wire is bonded, wherein the strip-shaped film has plural openings formed therethrough so that when the strip-shaped film is rolled in a paper sheet, intertwining occurs between upper paper fibers and lower paper fibers of the paper sheet via the plural openings or the strip-shaped film has dimples formed thereon.

The openings may be plural U-shaped notches whose internal areas are lifted up.

The dimples may be obtained by forming plural non-open impressions.

The size of the semiconductor chip is not larger than 0.5-by-0.5 mm and the width of the strip-shaped film is not larger than 3 mm.

According to the present invention, since the RFID base film and antenna portion have plural openings or bumps/pits, the upper paper layer and lower paper layer of the RFID tag can be united together strongly due to enhanced adhesion between the paper portion and the RFID portion or between the gum portion and the RFID portion. By this structure, the thickness of an RFID-incorporated paper card can be reduced down to about 0.1 mm. Such a thin paper card is difficult to realized by prior art structures.

DETAILED DESCRIPTION

The best mode for carrying out the present invention will be described below with reference to the drawings.

Embodiment 1

Figure 1:
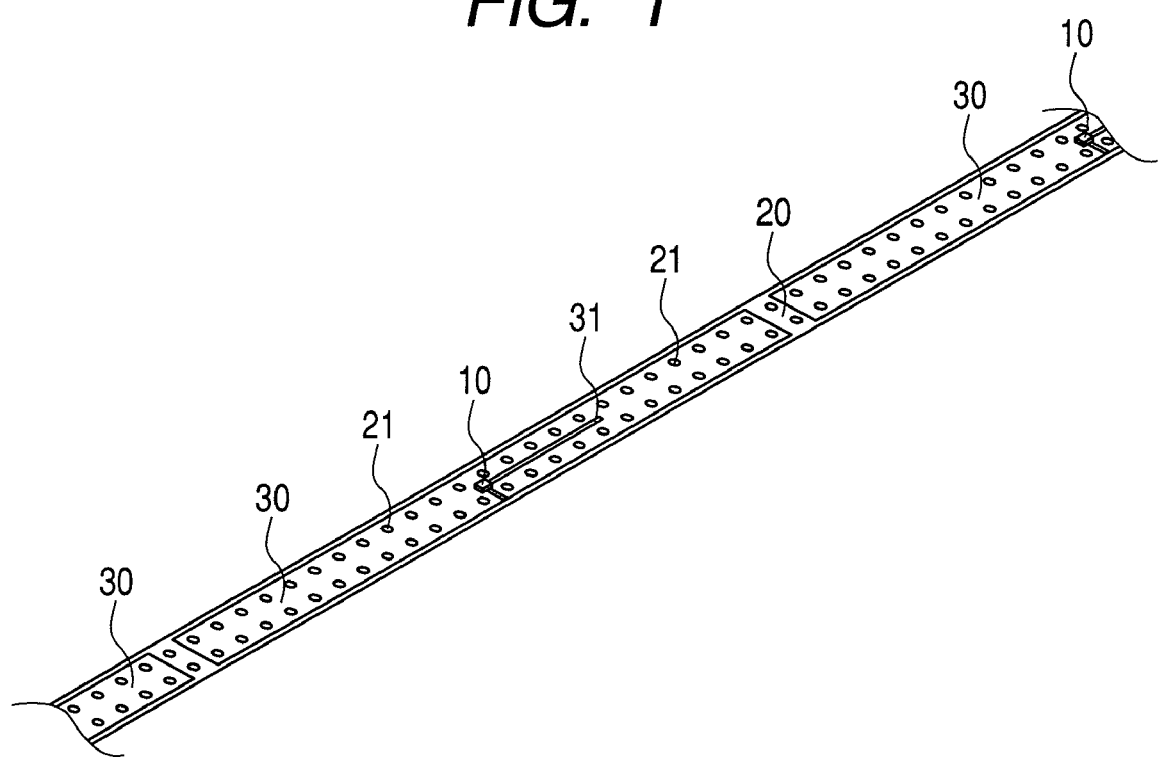
FIG. 1 is a perspective view of an RFID thread in accordance with a first embodiment.

Firstly, a first embodiment of the present invention is described by using FIGS. 1 through 6. FIG. 1 is a perspective view of an RFID thread to which the present embodiment is applied. On a 30 μm-thick base film 20 made of PEN (polyethylene naphthalate), a 7 μm-thick aluminum wire antenna 30 is formed. This antenna has a slit 31 formed thereon. A cut-out RFID chip 10 of at most 0.5 by 0.5 mm is bonded so as to straddle (stride over) this slit 31. An RFID circuit is constructed from the antenna 30 and RFID chip 10. This RFID portion is repeatedly disposed on the strip-shaped base film 20. In the present embodiment, the base film 20 has a width of 3 mm and each antenna 30 is 55 mm long. Since the RFID portion is repeated at a pitch of 57 mm, the base film 20 is repeatedly exposed by 2 mm. Note that the thickness of the base film 20 and that of the antenna 30 are not depicted. Also note that the RFID chip 10 and slit 31 are depicted larger since they can not be recognized if depicted on the same scale as the others.

The base film 20 and antenna 30 have many openings 21 formed therethrough except where the above-mentioned slit 31 and RFID chip 10 are located. The openings 21 are round holes formed by means of punch out and arranged in two rows at the same pitch. Due to the roundness and the same pitch, stress concentration is less likely to occur from external force, which reduces the possibility that external force may break the antenna 30 or detach the RFID chip 10 during paper manufacture process or practical use.

In addition, since the openings 21 are formed so as not to interfere with the periphery of the antenna 30 or the slit 31, the deterioration of the antenna 30 in communication performance due to the openings 21 is minimized.

Figure 2:
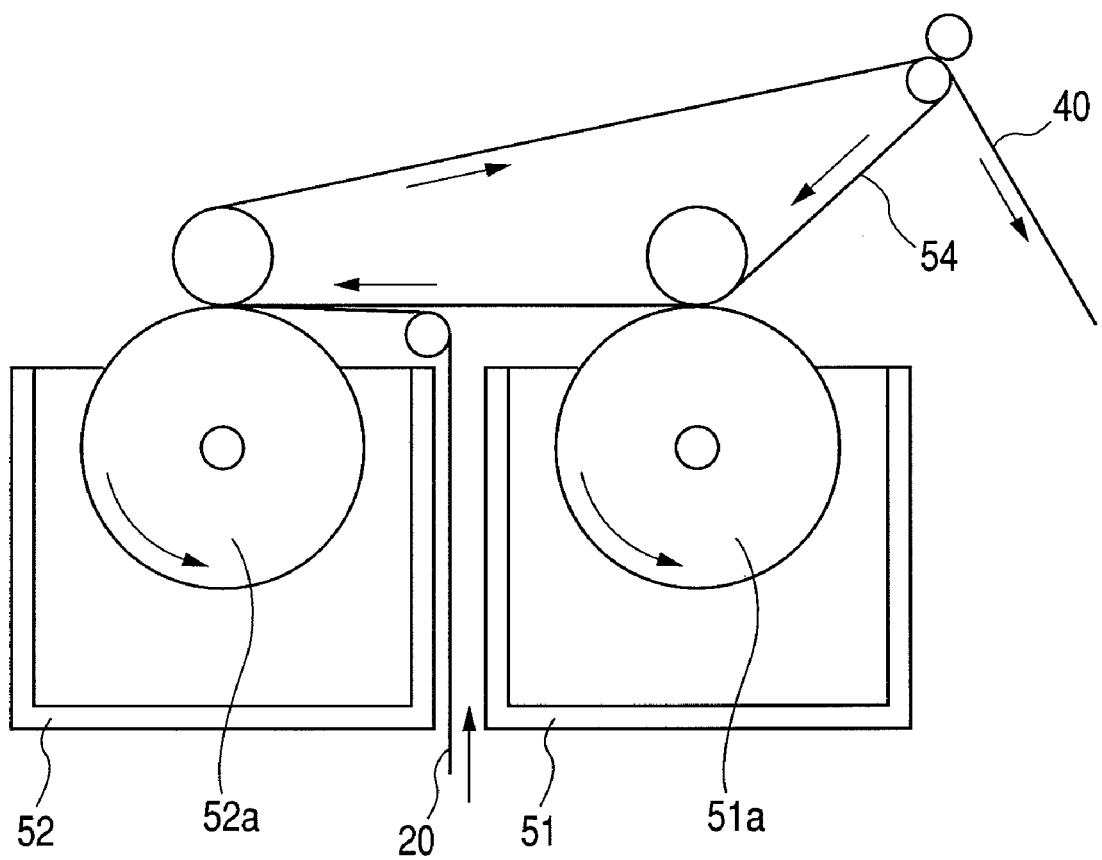
FIG. 2 is a schematic diagram for illustrating how RFID threads in accordance with the first embodiment are rolled in paper by using a cylinder paper machine.

FIG. 2 shows how this base film 20 having the RFID portion repeatedly thereon is rolled in paper. When the roll-in is done with a plurality of paper layers, it is common to use a cylinder paper machine as shown in FIG. 2. A two-tank type cylinder paper machine is exemplarily shown in FIG. 2. Dipped in a pulp solution in the first reservoir tank 51, a cylindrical wire mesh 51a is rotating. Pulped material adheres to the wire mesh 51a, forming a wet film of dewatered paper material on the wire mesh 51a. Since this film is pressed against the blanket 54, this film is detached from the wire mesh 51a and driven by the blanket 54 toward the second wire mesh 52a. In this process, a strip-shaped base film 20 having RFID portions formed thereon beforehand is supplied externally. Consequently, the base film 20 is sandwiched between the wet film on the blanket 54a and another wet film which is formed similarly on the wire mesh 52a in the second reservoir tank. In this process, upper and lower fibers (pulped materials) of the wet films intertwine with each other through openings 21 of the base film 20 since the pulped material is not yet sufficiently dewatered. The amount of material attached to the top side and that to the bottom side can be adjusted respectively by changing the material concentrations in the reservoir tanks 51 and 52.

Then, the damp-dry paper sheet 40 is detached from the blanket 54 and sent to the subsequent dewatering/drying stage. Needless to say, although a two-tank type cylinder paper machine is used in this embodiment, it is also possible to use a cylinder paper machine provided with more tanks, for example, if the paper sheet 40 must be made thicker or another perforated sheet layer is added in order to suppress the projection of RFID chips 10.

Figure 3A:
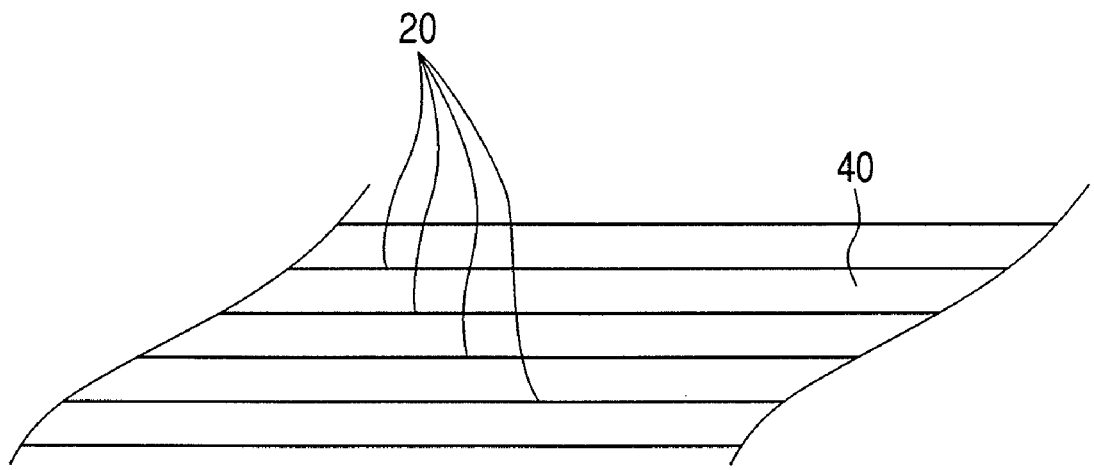
FIG. 3A illustrates the condition of a paper sheet which has gone through the dewatering/drying process and FIG. 3B is an enlarged explanatory partial view where the upper section of the paper sheet is cut off to expose the inside.
Figure 3B:
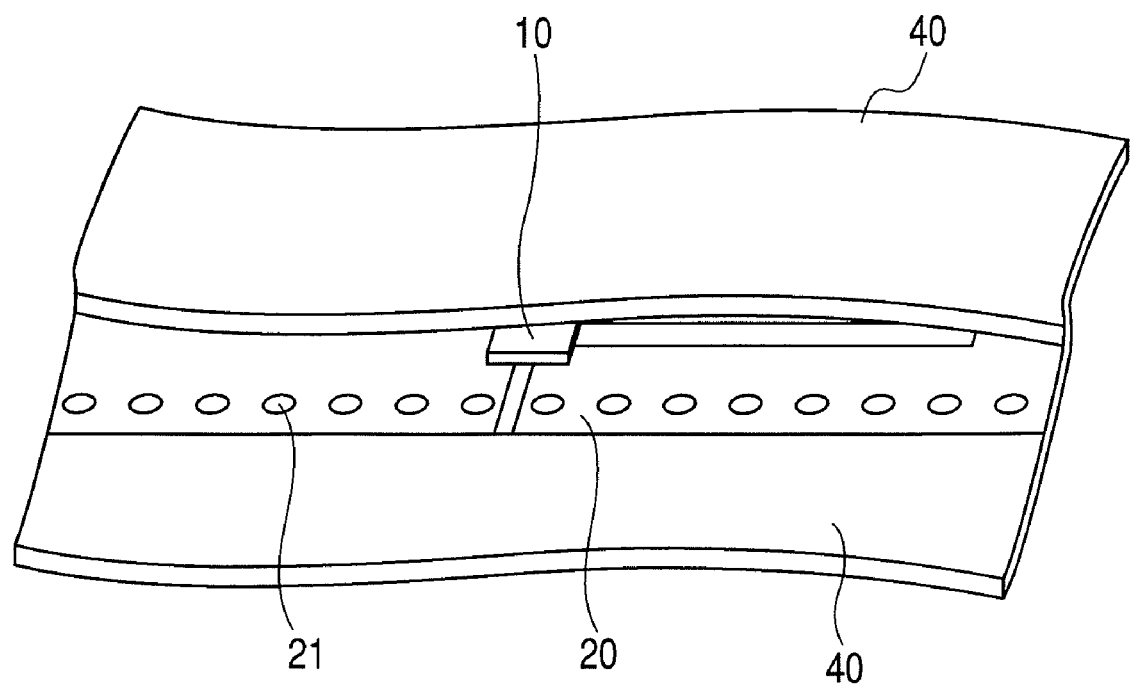

FIG. 3A shows the condition of the paper sheet 40 which has gone through the dewatering/drying stage. In the paper sheet 40, a plurality of base films 20 are included. Substantially, they are arranged in parallel at the same pitch. Note that although the base films 20 are depicted clearly in FIG. 3A for the purpose of explanation, it is actually difficult to recognize them in appearance since they are incorporated in the paper. FIG. 3B is an enlarged partial view of the paper sheet 40. In FIG. 3B, the front upper section of the paper sheet 40 is removed so as to expose an incorporated base film 20. As shown, this base film 20 has plural openings 20 formed therethrough and an RFID chip 10 mounted thereon.

Figure 4A:
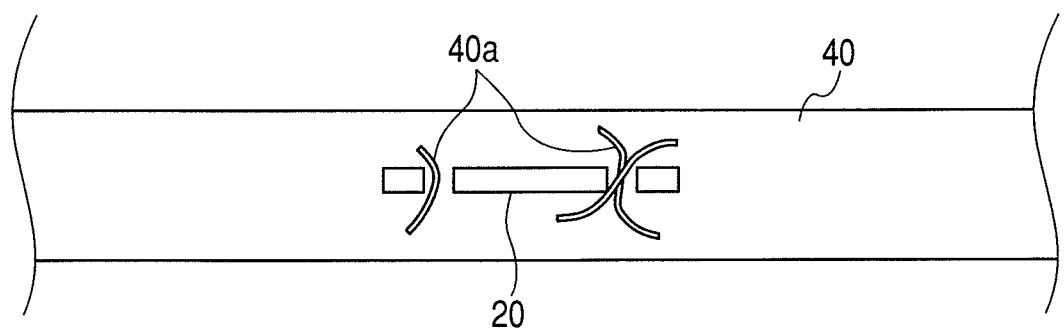
FIG. 4A is a partly enlarged cross sectional view of a paper sheet containing one base film and FIG. 4B is a perspective view of the sheet where the sheet is partly cut off to show openings and paper fibers included in the cross section.
Figure 4B:
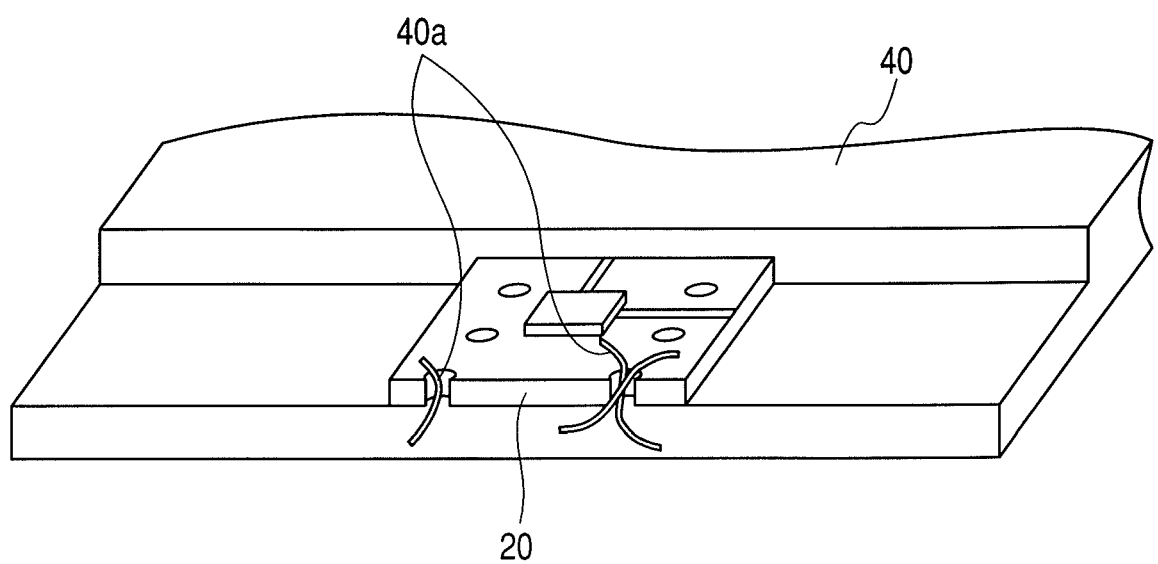

FIG. 4A is an enlarged cross sectional view of the paper sheet 40 including one base film 20. The upper and lower paper layers are united since paper fibers 40a which basically constitute the paper sheet 40 go through openings 21 of the base film 20, resulting in strong adhesion between the paper sheet 40 and the base film 20. FIG. 4B is a perspective view of the paper sheet 40, wherein the upper paper layer of the paper sheet 40 is partly removed in order to observe the openings 21 and paper fibers 40a included in the cross section. When the base film 20 is rolled in, paper fibers on each side thereof go through the openings 21 and intertwine with those on the opposite side. Since the openings 21 bored through both the base film 20 and the alumina antenna 30 layer thereon are arranged almost overall, it is possible to unite the paper sheet 40 and the RFID portion. Finally, this paper sheet 40 is cut into pieces each containing at least one RFID portion in order to obtain an anti-counterfeit RFID thread-used paper set.

Figure 5:
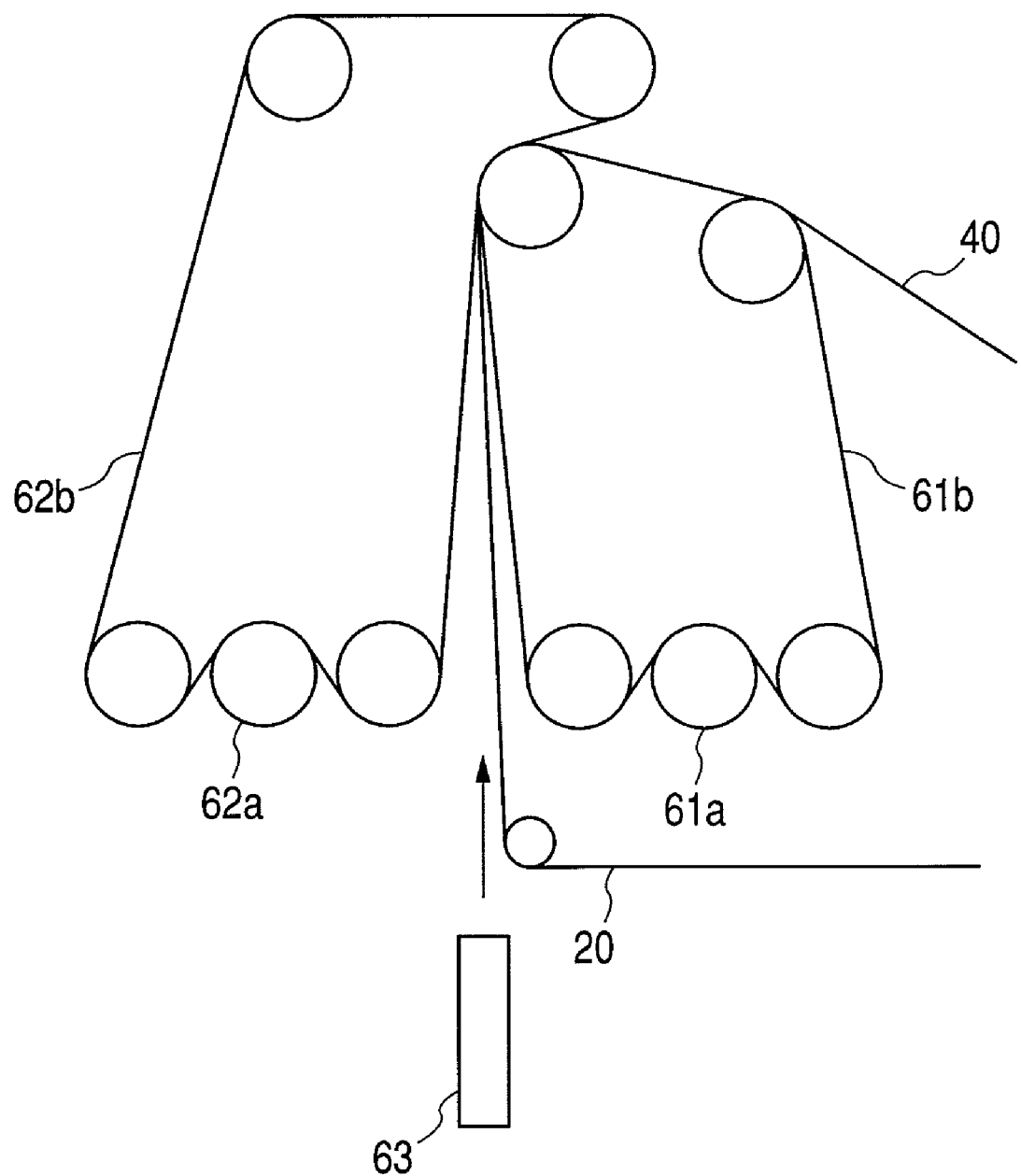
FIG. 5 is a schematic diagram for illustrating how an RFID thread in accordance with the first embodiment is rolled in by using a Fourdrinier paper machine.

The aforementioned manufacture method uses a cylinder paper machine. The following describes a variant of this manufacture method. FIG. 5 is a schematic diagram for illustrating how an RFID thread in accordance with the present embodiment is rolled in by using a Fourdrinier paper machine. Two band-shaped wire meshes 61b and 62b are stretched by rollers 61a and 62a so that a wedge-shaped gap is formed. Pulp slurry is injected into this wedge-shaped portion by a slit nozzle 63. In addition, a strip-shaped base film 20 is supplied externally into this wedge-shaped portion. Therefore, the paper materials are altogether sandwiched between the wire meshes 61b and 62b and almost completely dewatered. Then, a wet paper sheet 40 drawn onto the wire mesh 61b is detached therefrom and conveyed to the next dewatering/drying stage.

This method also can attain the same effect as the previously described method. In addition, this method has an advantage that since the pulped material is molded together with a base film 20 by one sandwiching operation, higher unity can be attained between paper pulp on top side of the base film 20 and that on the bottom side thereof.

Figure 6:
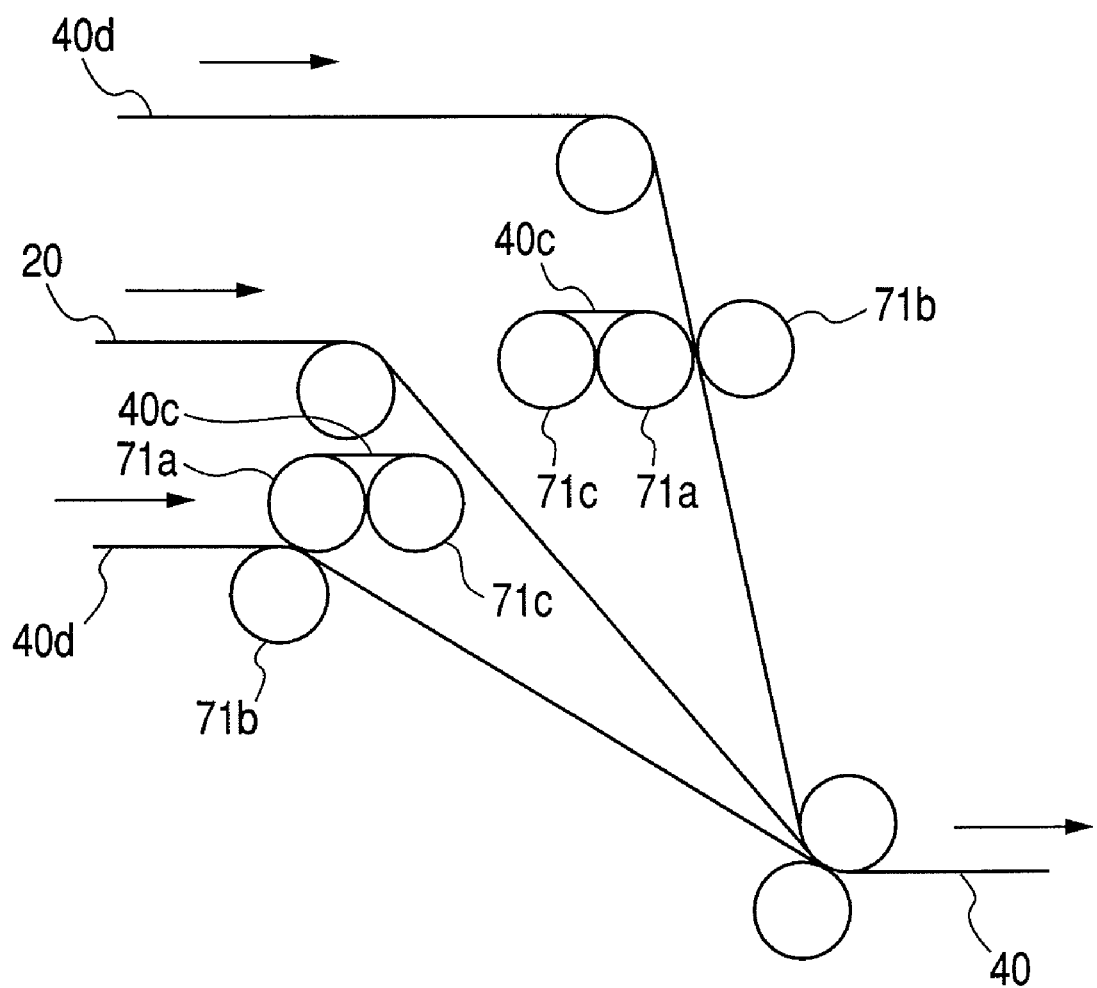
FIG. 6 is a schematic diagram for illustrating how an RFID sheet in accordance with the first embodiment is sandwiched by milled paper sheets.

As another manufacture method, the above method may be modified so as to laminate two milled paper sheets together. FIG. 6 illustrates this manufacture method. Two paper sheets 40d each milled to a thickness of, for example, 45 μm, are fed. Each paper sheet 40d is pulled in by a pair of rollers; an application roller 71a and a pressure roller 71b. A holding roller 71c is disposed behind the application roller 71a and a cellulose-based glue solution 40c is stored between the two rollers. Therefore, the glue is applied to one side of each of the two paper sheets 40d. In this state, a strip-shaped base film 20 is sent. As pressed between rollers, the three elements are laminated into a paper sheet 40. Then, the paper sheet 40 is sent to the drying stage.

In this method, since the fluidity of the glue solution 40c is sufficiently high, the upper and lower layers of the paper sheet 40 can be bonded together satisfactorily through fine openings 21 of the base film 20. This is advantageous in designing the antenna since the openings 21 can be designed smaller.

As mentioned so far, an RFID thread in accordance with the present embodiment has many openings bored through its base film and antenna except where a slit is formed and where an RFID chip is mounted. Therefore, when the RFID thread is developed to a paper sheet, paper fibers on the upper side of the thread and those on the lower side go thorough the openings and intertwine with paper fibers on the opposite side. Since the upper and lower layers of the paper sheet can thus be united via the openings, it is possible to prevent the RFID thread from floating even if the paper sheet is deformed by external force.

Figure 7:
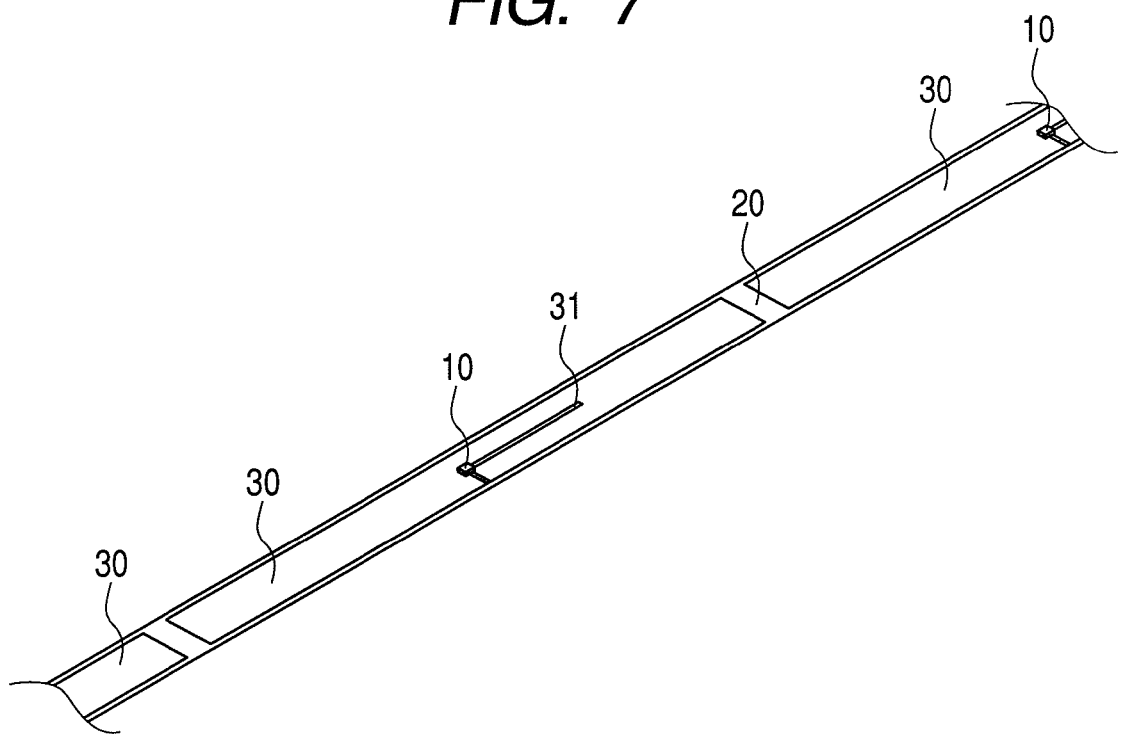
FIG. 7 is a perspective view of a conventional RFID thread.
Figure 8:
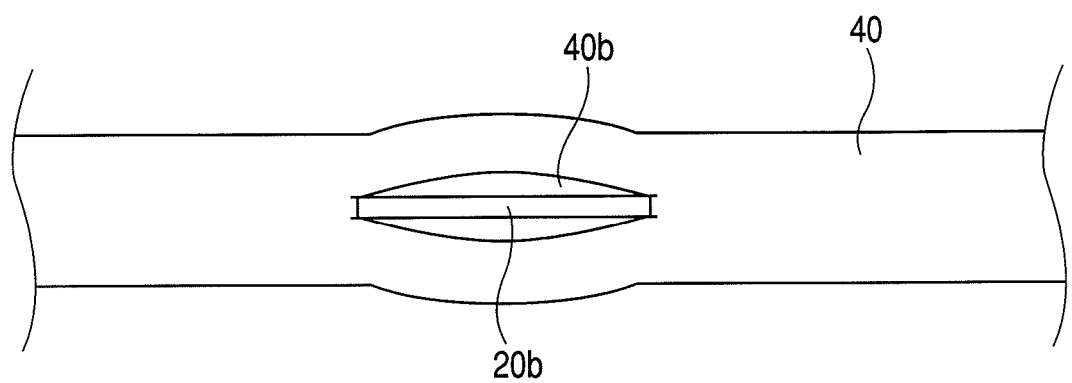
FIG. 8 is a cross sectional view of a sheet with the conventional RFID thread structure not in accordance with the present invention, indicating the internal RFID is detached from the upper and lower paper layers.

In the case of a conventional RFID thread structure as shown in FIG. 7, the above-mentioned openings are not formed. The base film 20 is made of such a polyester material as PEN (Polyethylene naphthalate) which is difficult to attain adhesion with cellulose or paper fiber. Likewise, the antenna 30 made of aluminum is difficult to attain adhesion with them. Therefore, if this RFID thread is developed to a paper sheet 40, external force may cause the upper and lower layers of the paper sheet 40 to separate from the non-perforated base film 20b, resulting in a lift 40b as indicated in the cross sectional view of FIG. 8. In an extreme case, the base film 20b may slip in the length direction and fall off from the paper sheet 40.

Figure 9:
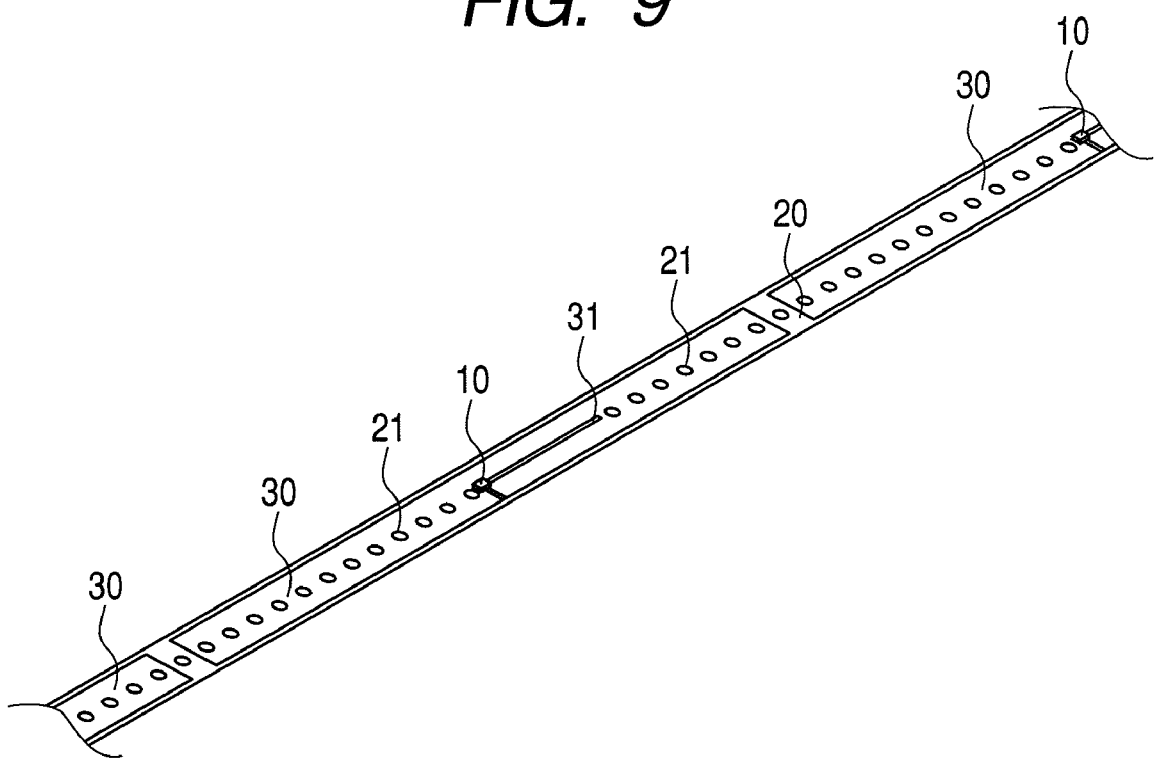
FIG. 9 is a perspective view of an RFID thread, a variant of the first embodiment.

Note that the openings 21 in the present embodiment may be modified in arrangement, shape and structure. FIG. 9 shows a modified embodiment where openings 21 are arranged in a row along the center of the antenna 30. Advantageously, since the openings 21 are decreased, this embodiment can reduce the possibility that the antenna 30 may be elongated or broken due to tension or the like when the thread is developed to a paper sheet or when the paper sheet is used.

Embodiment 2

Figure 10:
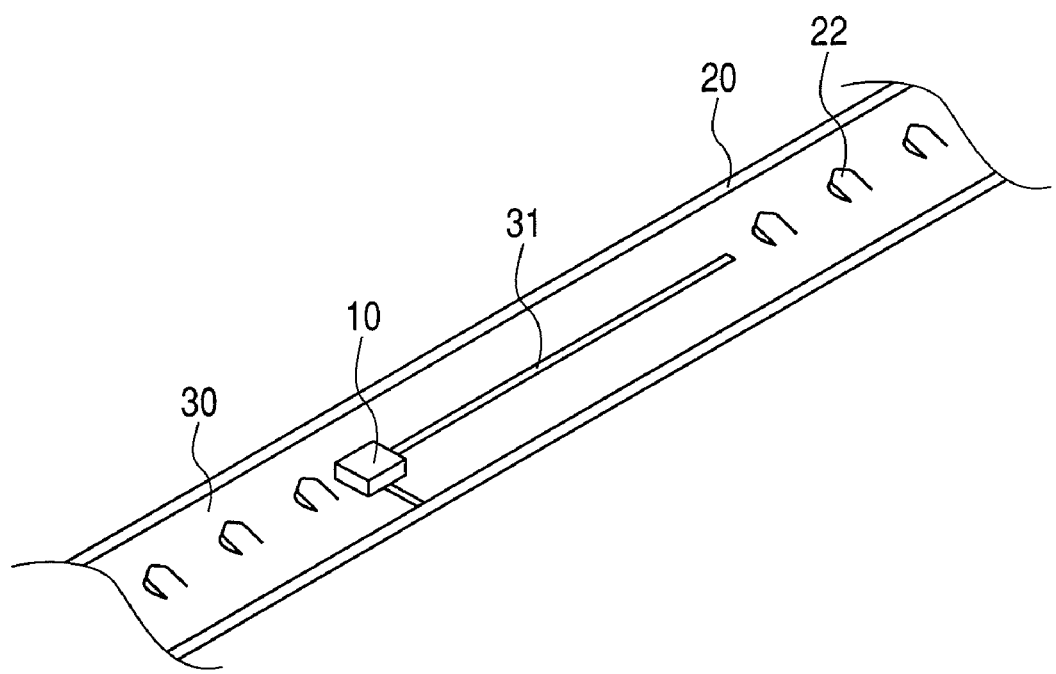
FIG. 10 is a perspective view of an RFID thread in accordance with a second embodiment.

The following describes a second embodiment of the present invention. The second embodiment is characterized in that semi-open U-shaped notches 22 are formed instead of openings 21. FIG. 10 is its perspective view. The other components are the same as in the first embodiment and therefore description thereof is omitted. Unlike the openings 21, any part of the thread is not cut away to form them. Advantageously, the notching process does not produce scraps. Such scraps may be left and sandwiched, resulting in poor adhesion or abnormal appearance.

Embodiment 3

Figure 11:
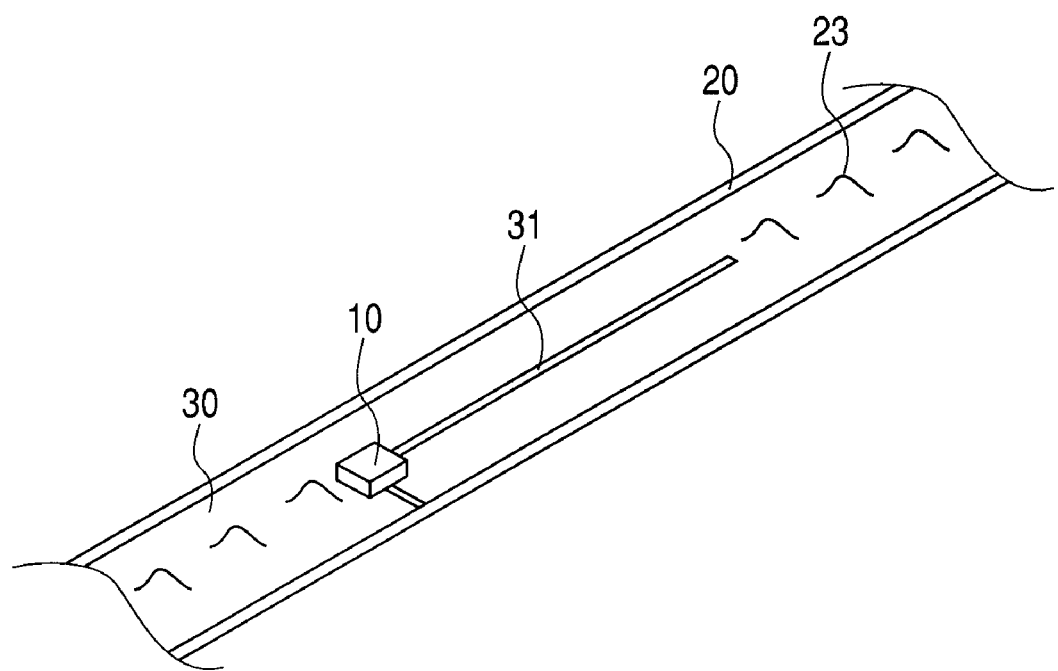
FIG. 11 is a perspective view of an RFID thread in accordance with a third embodiment.

The following describes a third embodiment of the present invention. The third embodiment is characterized in that dowel-shaped projections 23 are formed on the base film 20 and antenna 30 by a dimpling process instead of the openings 21. FIG. 11 is its perspective view. The other components are the same as in the first embodiment and therefore description thereof is omitted. Although adhesion with paper fibers is somewhat weaker, this embodiment has the advantage that the projections 23 serve to prevent the base film 20 from falling off even if the paper sheet 40 has a lift 40b. This embodiment is also advantageous in that the antenna performance is not lowered since no holes are formed through the antenna 30. In addition, this embodiment has the advantage that no scraps are produced similar to the second embodiment.

What is claimed is:

1. A sheet-shaped material comprising:
   a strip-shaped film onto one side of which a semiconductor chip containing plural bits of memory and provided with an antenna wire is bonded; and
   a paper sheet;
   wherein the strip-shaped film is rolled in the paper sheet so that the upper layer and lower layer of the paper sheet are bonded together by means of intertwining between upper paper fibers and lower paper fibers.

2. The sheet-shaped material according to claim 1, wherein the film has plural openings disposed therethrough except where the semiconductor chip is mounted so that intertwining occurs between upper paper fibers and lower paper fibers of the paper sheet.

3. The sheet-shaped material according to claim 2, wherein the openings are arranged in two rows of round holes formed at the same pitch by punch-out.

4. The sheet-shaped material according to claim 2, wherein the openings are plural U-shaped notches whose internal areas are lifted up.

5. The sheet-shaped material according to claim 1, wherein the film has dimples formed except where the semiconductor chip is mounted.

6. The sheet-shaped material according to claim 5, wherein the dimples are obtained by forming plural non-open impressions.

7. An RFID thread comprising a strip-shaped film onto one side of which a semiconductor chip containing plural bits of memory and provided with an antenna wire is bonded,
   wherein the strip-shaped film has plural openings formed therethrough so that when the strip-shaped film is rolled in a paper sheet, intertwining occurs between upper paper fibers and lower paper fibers of the paper sheet via the plural openings, or the strip-shaped film has dimples formed thereon.

8. The RFID thread according to claim 7, wherein the openings are plural U-shaped notches whose internal areas are lifted up.

9. The RFID thread according to claim 7, wherein the dimples are obtained by forming plural non-open impressions.

10. The RFID thread according to claim 7, wherein the size of the semiconductor chip is not larger than 0.5-by-0.5 mm and the width of the strip-shaped film is not larger than 3 mm.

* * * * *